Patented June 24, 1941

2,247,282

UNITED STATES PATENT OFFICE 2,247,282

GROUND CLAMP FOR ELECTRICAL WELDING MACHINES

Andrew L. Webb, Beaumont, Tex.

Application November 20, 1939, Serial No. 305,338

1 Claim. (Cl. 173—273)

This invention relates to clamps, and particularly to ground clamps for electrical welding machines.

In some instances and as at present practiced, the welder makes his ground by means of a screw clamp, or by laying a piece of metal across the end of the cable. The first of these methods is slow in attaching and removing the clamp, while the second method provides a loose connection which causes excess wear on the welding machine and is continually coming loose from the material being welded.

It is the primary object of the present invention to provide a clamp of the above mentioned nature which can be quickly attached to almost any thickness of metal plate, rod or pipe, and instantly provides a positive connection which cannot become loose or cause excess wear on the welding machine. The clamp is thus not only a time saver to the welder, but a protection to his equipment.

The invention will be clearly understood from a perusal of the following detailed description, taken in connection with the accompanying drawing, and in the drawing.

Figure 1:
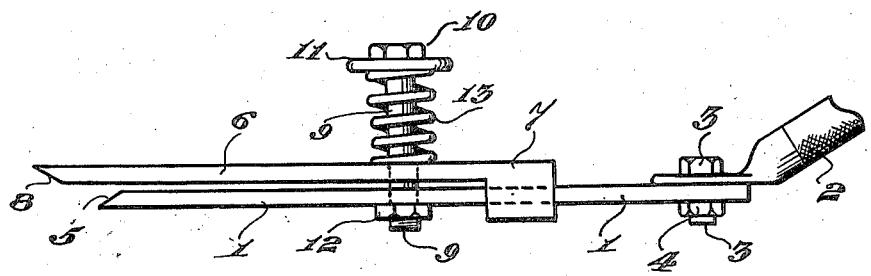
Figure 1 is a side elevational view of the improved clamp in non-engaged position.
Figure 2:
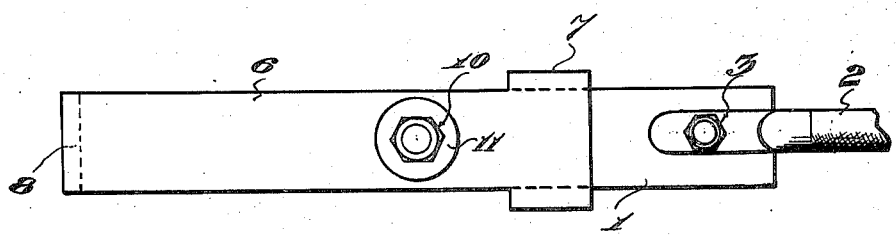
Figure 2 is a top plan view of Figure 1.
Figure 3:
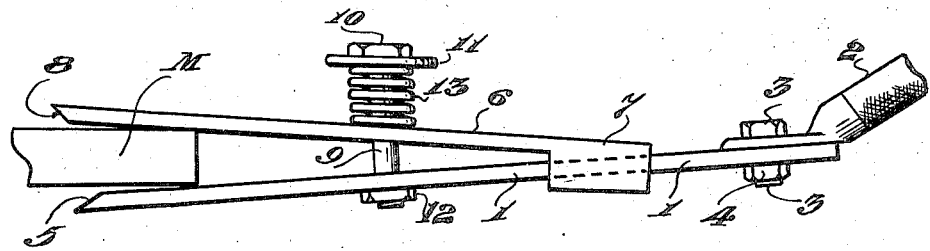
Figure 3 is a side elevational view of the clamp in operative use on a piece of material being welded.

In carrying out the invention there is provided a strip of metal 1, and to which is connected a cable 2 from an electrical source. The cable 2 is secured to the strip 1 by means of a bolt 3 and nut 4. The outer or free end of the strip 1 has its edge bevelled as at 5.

Another strip of metal 6 having an enlarged and recessed end 7 is placed normally parallel to the strip 1, with the strip 1 passing through the recess, as indicated by the broken lines in the drawing. The outer or free end of the strip 6 also has its edge bevelled as at 8, the two bevelled ends 5 and 8 constituting jaws in connection with the strips 1 and 6.

Each strip is bored to receive a bolt 9, having a head 10, a washer 11, and a nut 12. The washer 11 and the top side of the strip 6 provide a seat for a spring 13. The spring provides a gripping hold for the jaws formed at the ends of the strips in connection with the bevelled edges 5 and 8. It will be noted that the upper strip 6 extends beyond the end of the lower strip 1 and this arrangement provides a more easy and convenient and a quicker means of engaging the clamp with a piece of material M to be welded.

In use the welder slips the jaws of the clamp over some portion of the material M to be welded, and the spring 13 holds the jaws of the clamp tightly upon the material. When the welding is completed, a pull on the cable 2 will quickly release the clamp.

While the clamp is simple in construction, it provides an efficient means for the purpose intended, such construction, however, being capable of some modification, in keeping with the spirit of the invention and such as would be within the scope and meaning of the appended claim.

What is claimed is:

A ground clamp for electrical welding machines comprising a piece of material of continuous straight, flat elongated form and providing a strip, a rectangular-shaped loop formed on one end of the strip, a second piece of material of continuous straight, flat elongated form and providing a companion strip for the first-mentioned strip, the second or companion strip being longer than the strip with the rectangular-shaped loop and adapted to be passed through the rectangular-shaped loop, both strips lying normally in parallel spaced relationship, the outer or engaging end of the first-mentioned strip projecting beyond the engaging end of the companion strip, the engaging end of both strips being bevelled, means for connecting a cable to the companion strip, and a bolt means mounted in apertures in the strips intermediate their ends, a spring mounted on the bolt means whereby to resiliently secure said first-mentioned strip to said companion strip.

ANDREW L. WEBB.